(No Model.)
G. W. MECHAM.
WHEEL.
No. 324,141.  Patented Aug. 11, 1885.
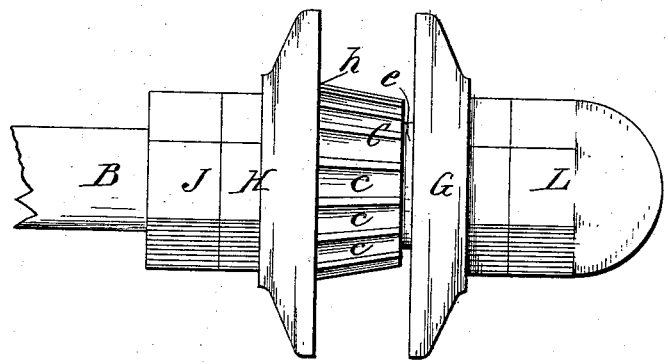
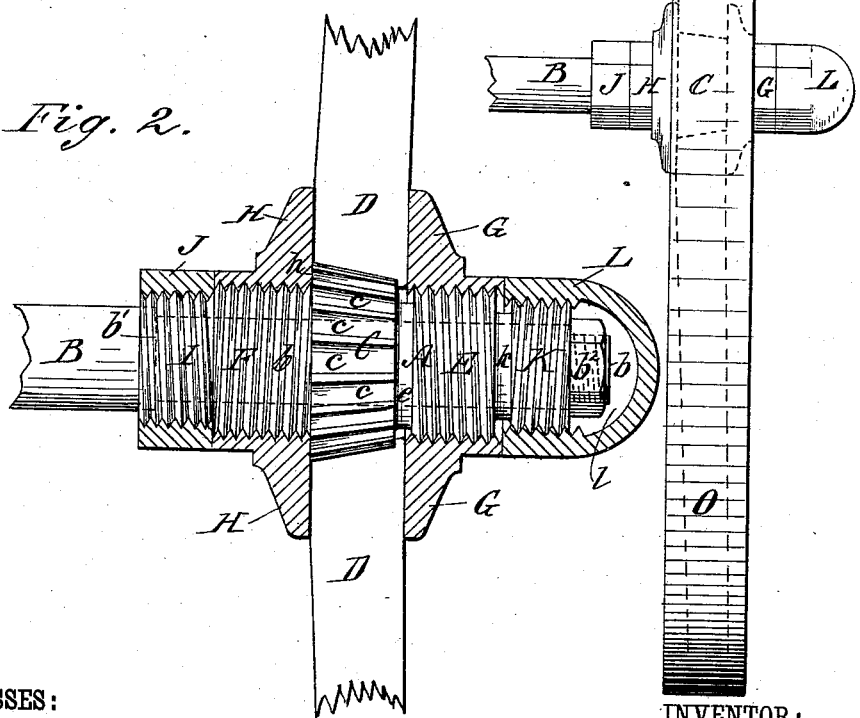
WITNESSES:
INVENTOR:
G. W. Mecham
BY Munn & Co.
ATTORNEYS.

UNITED STATES PATENT OFFICE.

GEORGE WATE MECHAM, OF COLUMBIA, TEXAS.

WHEEL.

SPECIFICATION forming part of Letters Patent No. 324,141, dated August 11, 1885.

Application filed May 7, 1885. (No model.)

*To all whom it may concern:*

Be it known that I, GEORGE WATE MECHAM, of Columbia, county of Brazoria, State of Texas, have invented certain new and useful Improvements in Vehicle-Wheels, of which the following is a full, clear, and exact description.

My invention relates to improvements in that class of expanding wheels in which the hub is provided with an inclined abutment, on which the inclined ends of the spokes rest, the said spokes being clamped in position and adjusted on the abutment by clamping collars; and the invention consists in the peculiar construction and arrangement of parts, as hereinafter fully described, and pointed out in the claims.

Reference is to be had to the accompanying drawings, forming part of this specification, in which similar letters of reference indicate corresponding parts in all the figures.

Figure 1 is a side elevation of the hub of my improved wheel and portion of the axle. Fig. 2 is a sectional side elevation of the hub, with the axle and spokes shown in part and in side elevation; and Fig. 3 is an edge view of the wheel partly broken away and in section and as applied on the axle.

The letter A indicates the axle-box of the wheel-hub, which box preferably is made in a single piece of metal, and is bored axially to receive the arm $b$ of the axle B, on which the wheel is placed, and so that the axle-shoulder $b'$ at the inner end of the axle-arm rests in a counterbore made to receive it in the inner end of the axle-box A, as indicated in dotted lines in Fig. 2.

On the reduced threaded outer end of the axle-arm $b$ is placed a nut, $b^2$, which binds against a shoulder of the arm just outside of the end of the axle-box, to hold the wheel to the axle so it may turn freely thereon.

About at the center of the axle-box A is formed on or fixed to it the outwardly-tapering collar C, which has notches or recesses $c$ across its periphery, in which the inner inclined ends of the wheel-spokes D rest, and at opposite sides of the collar C the axle-box A is provided with screw-threads E F, which are right and left hand threads, respectively, and on these screw-threads are placed the opposite flanged collars G H, respectively, which clamp the opposite faces of the spokes D between them.

Inside of the left-hand screw-thread F the axle-box A is reduced in diameter, so that opposite or right-hand threads I may be cut thereon, onto which threads I the lock-nut J is placed, to lock the inner collar, H, against turning loose, and outside of the right-hand screw threads E of the axle-box are cut on its reduced outer end the left-hand screw-threads K, on which is placed the lock-nut L, which prevents loosening of the outer spoke-clamping collar, G, and has a closed end portion provided with a cavity, $l$, in which the end of the axle-arm $b$ and its nut $b^2$ may turn freely, the nut L thus forming a cap which protects the axle-arm $b$ and nut $b^2$ from injury, and at the same time it excludes dust and dirt from the bearing of the axle-box on the axle-arm at its outer end, and the fit of the end of the axle in the counterbore of the axle-box A excludes the dust from the bearing at the inner end of the axle-box.

The clamp collars and nuts G H J L have flat-sided portions, to which a wrench may be applied for turning them as may be required. The screw-threads E are cut away at $e$, next the outer smaller end of the spoke-collar C, and the screw-threads K are cut away, as at $k$, next the screw-threads F, to allow the collar G and nut L to be set up from time to time when the wheel needs tightening up, as presently explained. I set the outer ends or tenons, $d$, of the spokes into metal socket-pieces M, fitted in the inside of the felly N of the wheel, around which the tire O is placed.

In assembling the several parts of the wheel the collar H is screwed onto threads F until it meets the inner face or shoulder, $h$, of the spoke-collar C, and the lock-nut J is applied on threads I. The spokes D then are entered by their tenons $d$ into the felly-sockets M, and the inclined inner ends of the spokes are set into the notches $c$ of collar C, and the collar G and lock-nut L then are applied at the outer end of the axle-box, all as clearly shown in Fig. 2. The collar C is somewhat thinner than the spokes D, so that if the wheel joints or tire become loose the nut J and collar H may be run back a little, and the collar G and nut L be moved inward, so as to force the spokes D up the inclined periphery of the collar C, and carry their ends *d* outward, so as to tighten the felly to the tire and take up all slackness of the spokes; and if a spoke should be injured or broken, the nut L and collar G may be removed and a new spoke easily and quickly be fitted in the wheel and the collar and nut be replaced, all of which may be done at any time or place without the assistance of a wheelwright or other wood-workman.

It is evident that by the fit of the spokes D on the inclined or tapering periphery of the collar C, and also between the clamp-collars G H, the spokes will retain the "dish" originally given them, so the wheel travels on a plumb spoke, and the wheel will have great stiffness and strength, so it will not break down easily under heavy loads on bad roads.

Another advantage of my wheel-hub is, that the spoke-clamp collars and lock-nuts constitute strong bands to the axle-box, allowing the box to be made quite light without sacrificing necessary strength, and the entire wheel presents a neat appearance, and may be made in any suitable size for a great variety of vehicles.

Having thus described my invention, what I claim as new, and desire to secure by Letters Patent, is—

1. A vehicle-wheel constructed with an axle-box, A, provided with a tapering spoke-supporting collar, C, notched at *c*, and right and left hand screw-threads E F and I K, the spoke-clamping collars G H, and lock-nuts L J, in combination with spokes D, socketed felly N, and tire O, substantially as herein set forth.

2. A vehicle-wheel constructed with an axle-box, A, provided with a tapering spoke-supporting collar, C, notched at *c*, right and left hand screw-threads E F and I K, spoke-clamping collars G H, and lock-nuts L J, and the inner end of the axle-box being counterbored to receive the end of the axle, and the nut L being closed to form a dust-cap and nut-protector at the outer face of the wheel, in combination with spokes D, socket-felly N, and tire O, substantially as herein set forth.

3. As an improved article of manufacture, the axle-box A, made with tapering spoke-supporting collar C, having notches *c*, and right and left hand screw-threads E F and I K, substantially as herein set forth.

4. An improved wheel-hub consisting of the box A, provided with the tapering and notched collar C, and having a right and left hand screw-thread, E I F K, on each side of the said collar, the flanged collars G H, and the lock-nuts L J, the nut L having a cavity, *l*, to receive the end of the axle, substantially as herein shown and described.

GEORGE WATE MECHAM.

Witnesses:
GEO. W. DUFF,
W. F. SWAIN.